Aug. 11, 1953

L. KRITTER 2,648,786

ELECTRIC MOTOR WITH ENCASED ROTOR

Filed Oct. 24, 1951

Louis Kritter
INVENTOR.

BY

Louis Kritter
INVENTOR.

Louis Kritter
INVENTOR.

Patented Aug. 11, 1953

2,648,786

UNITED STATES PATENT OFFICE 2,648,786

ELECTRIC MOTOR WITH ENCASED ROTOR

Louis Kritter, Paris, France

Application October 24, 1951, Serial No. 252,830
In France October 25, 1950

8 Claims. (Cl. 310—46)

This invention relates to electric motors of the type used in fluid circulation systems for the driving of pumps or compressors which are contained in sealed units or which are of the "single cavity" type, so-called, and in which the nature of the fluid circulating within the system does not admit the use of packing glands or stuffing boxes through which a leakage of the fluid may occur.

Such sealed units are, for instance, used in connection with pumps circulating explosives for highly corrosive fluids or in connection with refrigeration systems in which the refrigerant is frequently of a corrosive nature.

The electric motors of this type are usually completely enclosed within the vessel or container enclosing the pump or compressor, but in this case are inaccessible and therefore no repair or adjustment can be made without complete disassembly. It has therefore been proposed to use electric motors in which merely the rotor is enclosed, while arranging the field magnets on the outside. This type of electric motor has, however, serious limitations, as the container in this case must be inserted between the field magnets and the armature and as the formation of arcs or sparks within the container is objectionable in many cases so that the armature cannot carry a winding. On account of these limitations, the electrical characteristics of such motors are not completely satisfactory, and in most cases they prove to be only insufficiently adaptable to the type of service which they are supposed to perform. Especially the starting of the motor in every possible position with a sufficient torque to drive the pump or compressor, whatever the momentary position the piston occupies, it is difficult to obtain with the limitations imposed upon such motors.

It is therefore the principal object of the invention to provide a driving system for devices or units completely enclosed within sealed and closed containers, using an alternating current, in which system all the electric circuits, connections and electrical units supplied by said circuits are arranged outside the container and are completely accessible without disassembling the unit. Likewise, it is an object of the invention to provide a system for driving devices or units of the above-mentioned type by means of an armature member arranged within the sealed container and driven by a field pole structure arranged around the said container.

A further object of the invention consists in providing a driving system of the type above mentioned consisting of a driving motor of the magnetic type with the pole structure comprising a plurality of poles formed by separately controlled electromagnets, the distribution of current and the electric control of the feeding currents for said magnets being performed by another motor of the magnetic type similar to the driving motor, the rotor of which is mechanically coupled with the rotor of the driving motor.

A further object of the invention consists in controlling the energization of the separate electromagnets of the driving motor either directly by the magnets of the distributing and control device or by means of relays which are energized over circuits controlled by the said distributing and control device.

A further and more specific object of the invention, connected with the application of the invention to those systems in which sparks or arcs formed within the container are not objectionable, consists in providing a special distributing and control device without electromagnet system, which distributing and control device is operated by the driving motor itself by means of a rotor forming a commutator and a collector arranged within the sealed container.

In order to attain the above-mentioned objects according to the invention, a special type of sealed-in electric motor is used which shows satisfactory starting and operating characteristics and which is specially adapted to cooperate with compressors or pumps of a fluid circulation system. The electric motor according to the invention is of the magnetic type and comprises an armature which is merely a notched or dented wheel of ferro-magnetic material without any winding and without electrical connections, said rotor being surrounded by a pole piece structure consisting of a series of single and independent magnets fixed to the outside of the sealed container and surrounding the same. As this type of electromagnetically operated motor is based on an alternative energizing and deenergizing of the electromagnets forming the poles in a predetermined succession of steps securing as uniform a starting and operating torque as possible, a current distribution and circuit control device must be used in connection with the said motor, which, according to the invention, also consists of a similar motor with a notched or dented wheel and a surrounding pole structure. The rotor of the said current distribution and circuit control device is mounted on the shaft driven by the electric driving motor and is also arranged within the sealed container carrying on the outside a system of electromagnets cooperating with said rotor. While the driving motor and the distribution controlling motor are of the same general type, the dimensions of the electromagnets forming the poles and the arrangement of these electromagnets may be different from the arrangement used in connection with the driving motor.

The alternative energization and deenergization of the electromagnets of the driving motor may be performed either by means of relays controlled by the current distributing device or it may be performed directly by using the change in the magnetic flux in the distribution device produced by the rotation of the rotor of the same and the change in the inductance of the circuit containing the electromagnets to control and influence the energizing currents of the electromagnets of the driving motor, this influence being of such a nature as to produce or to suppress the generation of a magnetic flux in the said driving motor electromagnets.

Further, according to the invention, in those cases in which the production of sparks or arcs within the container is not objectionable, the control of the distribution of electrical energy to the magnet system may be effected directly by means of a notched wheel or by a wheel containing alternating conducting and insulating sections which wheel may produce the desired closing and interruption of the feeding circuits for the electromagnets by means of a brush cooperating with the said wheels.

Further features of the invention and more specific objects will be apparent from the foregoing detailed specification.

The invention is described with reference to the accompanying drawings, showing one embodiment of the invention and several modifications of the method of distribution of the currents by way of example. It is, however, to be understood that the embodiments of the invention which are illustrated are illustrative and are shown by way of example only and that they do not represent a survey of all possible modifications of the invention. A departure from the modifications shown is therefore not necessarily a departure from the principle of the invention, as the modifications illustrated have been mainly selected in order to explain the principle of the invention and the best mode of applying the same.

In the drawings:

Figure 1 is an elevational sectional view of a sealed unit, the section being taken along the median plane of the compressor.

Figures 2, 3 and 4 are diagrams showing the connections between the distribution and control units and the driving motor. Figure 2 showing the connections diagrammatically of an arrangement in which the magnets of the driving motor are controlled by relays, Figure 3 being a diagram of the connections for an arrangement in which the magnets of the driving motor are directly controlled by the magnets of the distributing and control device, and Figure 4 being a diagram of the connections for an arrangement in which the magnets of the driving motor are controlled by a combined collector and commutator keyed to the driving shaft.

As above explained, the driving system, according to the invention, is especially adapted for those structures or assemblies in which the driven device, such as a compressor of refrigeration unit, a pump conveying explosive or corrosive liquids, and the like, is enclosed within a completely sealed vessel or container from which stuffing boxes or packing glands, because they cannot be made leakage-proof, have been eliminated, which compressor or pump is driven by an electric motor of which only the rotating member or rotor is located within the container, while the remainder of the motor structure is located on the outside. To avoid deterioration of the enclosed portion of the electric motor which is exposed to the influence of the fluid, the electric motor must be of such a type that the rotating structure is without any winding or electric connection, all the circuits, windings and connections being arranged and carried on the outside of the container or on a structure associated with the same.

Figure 1:
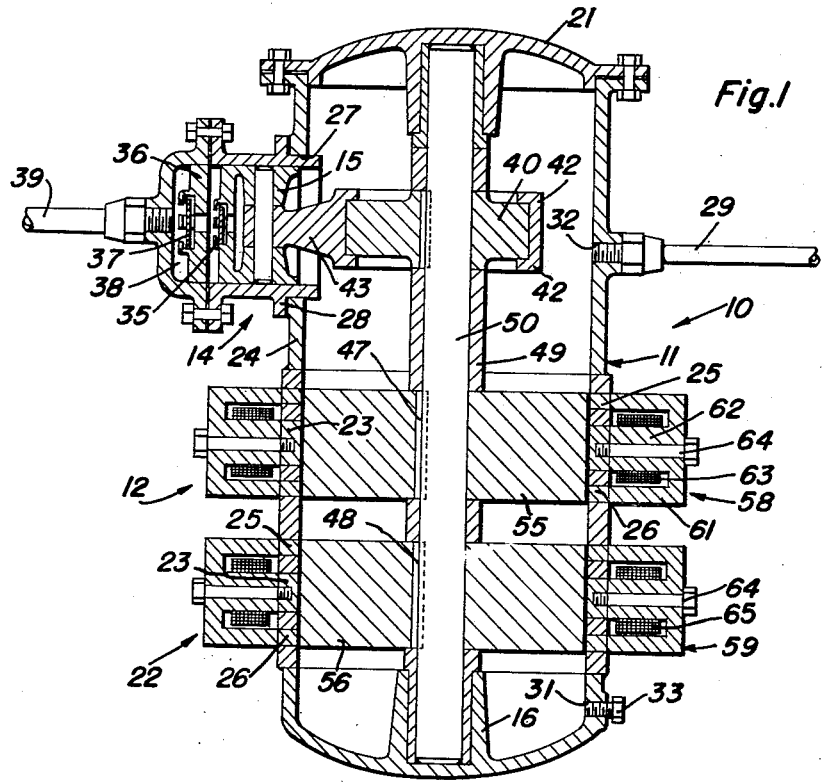

Figure 1 illustrates the general arrangement. The sealed unit is generally indicated at 10 and it comprises the completely closed and sealed container 11 housing the rotating parts of a driving electric motor generally indicated at 12, a compressor generally indicated at 14 and the driving members for transmitting power from the electric motor to the compressor which are described below. In addition, the unit also comprises a distributing and control device generally indicated at 22 in the shape of an electric motor similar to the electric driving motor, which device controls the operation of the motor 12 as will be described in the following specification.

The container 11 is completely closed at one side and on the other side is closed by a sealing cap 21. The cap and the bottom portion of the container are both provided with bearing sleeves 16 into which appropriate bearing members have been inserted. The side walls of the container are of a composite nature. The side wall consists of non-magnetic material into which magnetically permeable rings 23, 25, 26 have been inserted in a position and for a purpose which will be explained. An opening 27 in the container is surrounded by a seat 28 on which the compressor, generally indicated at 14, is mounted and tightly fixed. A further opening 32 of the container is connected with the suction pipe 29 for the refrigerant, while an opening 31 at the bottom of the container is permanently closed by a plug or stopper 33 for the purpose to empty the container when disassembled.

The compressor 14 is provided with a piston 15 having a suction valve 35 facing the bottom plate 36 of the compressor which is itself provided with a pressure valve 37 leading to the pressure space 38 which is connected with a pressure pipe 39 of the compressor leading, as usual, to the condenser of the refrigeration system.

The bearing member journals a drive shaft 50 which carries an eccentric 40 provided with a suitable ring 42 which is connected with a piston rod 43 on which the piston is mounted.

The drive shaft 50 is driven by the electric motor, generally indicated at 12, and it also drives the rotor of the distribution and control device 22 which has also the form of an electric motor.

Figure 4:
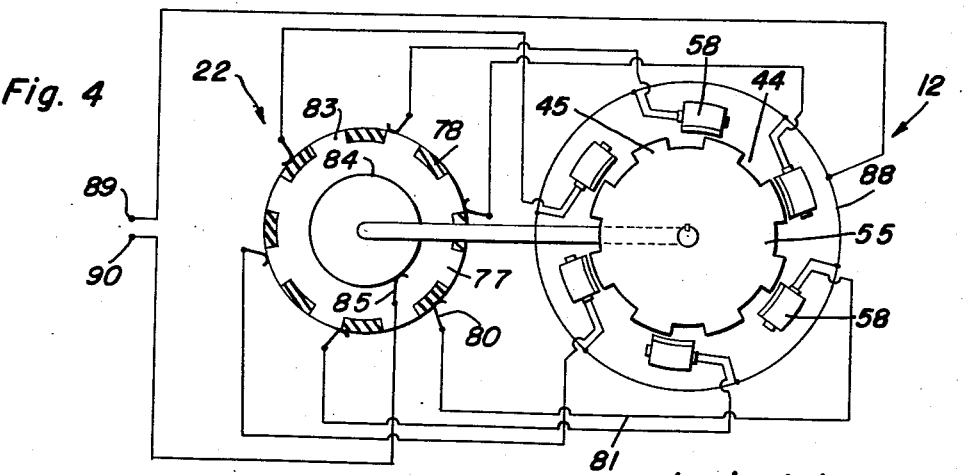
Figure 2:
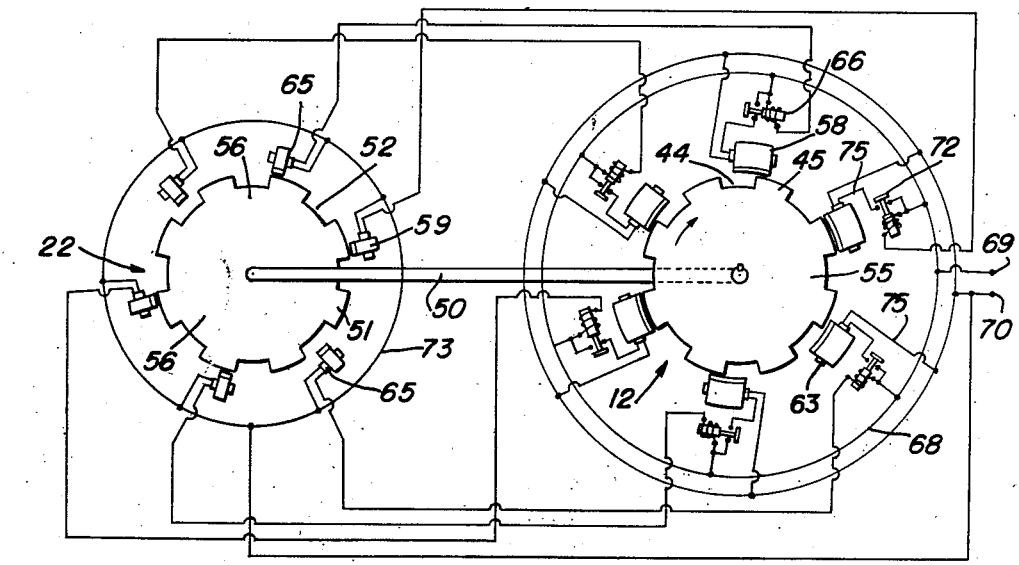
Figure 3:
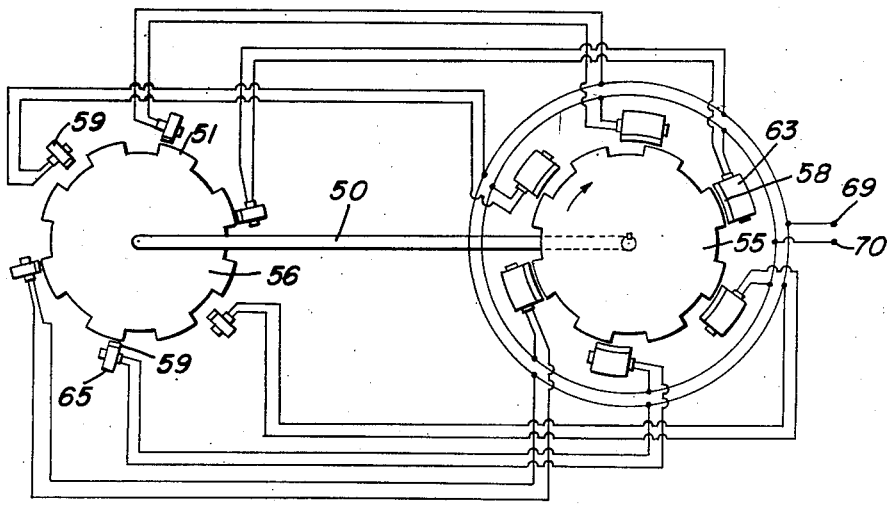

Both the driving electric motor 12 and the distributing and control device 22 are of the magnetic type, so called. Each motor comprises a rotor 55 and 56, respectively, which, as seen from Figures 2, 3 and 4, is provided with notches and teeth 44, 45, 51, 52, respectively. The rotors consist of magnetic material. They are both keyed to the shaft 50 by suitable keys 47 and 48. Moreover, spacing sleeves 49 may be carried by the shaft to hold the various parts seated on the shaft in their correct position regardless of the position of the unit and supporting the members in a vertical direction if the container should be placed in a vertical position.

The rotors 55, 56 are surrounded by a system of electromagnets 58, 59, respectively, forming the poles of the magnetic motor and the number of teeth 45, 51, respectively, is preferably larger than the number of electromagnets forming the poles of the motor in order to produce a starting torque in every position of the armature, even in the most unfavorable position.

The pole piece structure of the two magnetic motors, as clearly seen in Figure 1, is formed by mounting the electromagnets 58, 59 directly on the outside of the container wall 24 so that the container is surrounded by the electromagnets as closely as possible.

Each electromagnet 58, 59 consists preferably of a closed bowl or container 61 with a central core 62 carrying the winding 63, 65 of the electromagnet, respectively. The container is preferably of elongated shape and of an arcuate extension which is properly selected and which is at least equal to the arcuate length of a tooth or notch in the case of the magnets of the driving motor. The inner side of the magnet is curved along a circle in order to conform itself to the cylindrical shape of the container 14. The electromagnets may be fixed on the containers by means of the screw bolts 64.

The electromagnets 58, 59 are so placed on the wall of the container 24 that the annular portions 23, 25, 26 which are of magnetic material face the flux carrying portions of the magnets 58, 59. These inserted annular portions of magnetic material are brazed or welded to the remainder of the non-magnetic wall so as to form a unitary cylindrical wall structure.

The distribution of the current is controlled by the distribution control device 22. This control is exercised according to the example shown in Figure 2 by means of solenoids 66, the armature of which controls the energizing circuit of the electromagnets 58 forming the poles of the magnetic motor, each magnet being provided with a controlling solenoid. The energization of the solenoids 66 is controlled by the electromagnets 59 of the distribution control device 22.

As has been already mentioned, the construction of the distribution control device is on principle identical with the construction of the driving motor 12 with respect to structure in general, but the electromagnetic members 59 and the teeth 51 may be smaller and of a smaller arcuate extension than those of the driving motor if the rotor of the distribution control device 22 is in other respects identical with the rotor of the driving motor.

It will be understood that the rotors 55, 56 of the two motor devices 12, 22 move in unison as they are mechanically coupled with each other.

In the arrangement shown in Figure 2, the solenoids 66 controlling the energizing circuit of the magnets 58 are all connected on one side with a common conductor 68 leading to the terminal 69, while, on the other side, each solenoid 66 is arranged in series with one of the electromagnets 59 of the distribution control motor 22. These electromagnets 59 are all connected with a common conductor 73 which leads to the second terminal 70 of the network. Each solenoid has an armature 72 controlling the circuit of the electromagnets 58.

The relays of solenoids 66 connected with the network are so adjusted that the varying action of the electromagnets 59 with which they are connected in series produces an energization and deenergization of the said relays 66. It will also be clear that there will be a definite angular relationship between the positions of the poles of the distribution control motor 22 and the positions of the poles of the driving motor 12 so that in every phase one of the electromagnets, or a plurality thereof, tend to move the rotor into a position in which one of the electromagnets faces one of the teeth of the rotor 55. As soon as such a position is reached, however, the electromagnet must be deenergized and the next electromagnet of the group must be energized, thus causing the movement of another tooth towards the position in which it faces the electromagnet. This movement is again followed by deenergization and by shifting of the connection to the next magnet or group of magnets, etc.

Figure 5:
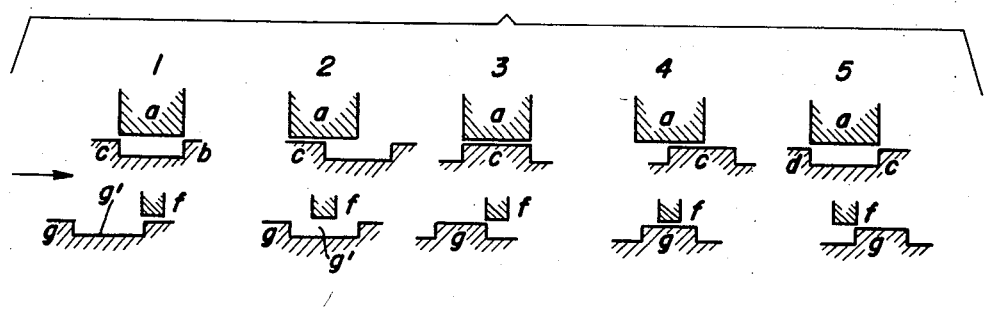
Figure 5 is a diagram illustrating the positions occupied by the two rotors relatively to their magnet poles during an angular movement of the rotor through 45°.

This distribution of the energization of the magnets of motor 12 is produced by means of the magnets 59 of the distribution control device 22, the rotor 56 of which rotates with the main rotor 55, as indicated in the diagram (Figure 5). As seen in the diagram the pole piece $a$ of one of the electromagnets 58 exercises a magnetic action on tooth $c$ of the rotor (corresponding to one of the teeth 45 of rotor 55, Figure 2) which in position 1 is still nil or at its minimum but which, as soon as tooth $c$ moves towards the pole $a$, while tooth $b$ moves away from said pole, starts to increase. The magnetic force is at its maximum in position 2 and the maximum value is maintained until position 3 is reached. When position 3 is left, the magnetic action drops again to its minimum or near zero value to avoid a braking action on tooth $c$ and is maintained at this value until position 5 is reached, which position is exactly similar to position 1 with the sole difference that tooth $c$ now occupies the position previously occupied by tooth $b$. In this position, the same cycle, as above described, starts for tooth $d$.

The variation of the magnetic action of pole $a$ is produced by variations of the energizing current flowing through the coil surrounding pole $a$ (not shown in the diagram but corresponding to coil 63 in Figure 1), which are produced by means of the distributing and control device. The corresponding positions of the controlling poles $f$ of the said distribution device with respect to a tooth of the rotor 56 passing below the pole $f$ for the same positions which have been shown with respect to pole $a$ are also shown in the diagram, Figure 5.

In position 1, the inductance of the coil surrounding pole $f$ starts to drop to its minimum value and in position 2 it has reached its minimum value with a minimum flux passing through the pole piece $f$. The flux starts to decrease when the notch $g'$ passes the pole $f$ and the induction remains unchanged until tooth $g$ reaches the pole $f$ in position 3 and starts to move across the pole. During the passage of tooth $g$ through positions 3 and 4, the inductance increases until position 5 is reached (which is similar to position 1) and in which the inductance again starts to decrease as soon as the tooth $g$ moves away from the pole piece $f$.

It will thus be seen that the reactance of the circuit including the coil 65 surrounding the pole piece $f$ decreases from position 1 to 3 and increases from position 3 to 5; therefore, the coils 65 surrounding the poles of the distribution and control device act like valves which govern the passage of the current through the coil 63 by regulating the current through the relay 66 which controls the energization of the coil 65 of the driving motor.

Figure 6:
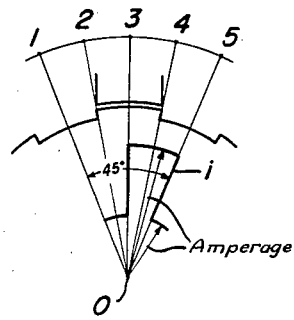
Figure 6 is a vectorial diagram illustrating the angular movement of the rotor of the driving motor through 45° and the amperage of the current flowing through the coils of the electromagnets in these positions.

According to the modification shown in Figure 3, the change of the inductance of the coil of the magnet 59, produced by the teeth of the rotor, is directly used to control the energization of the magnets 58 of the driving motor 12. Each magnet coil 65 of the distribution control device according to the modification shown in Figure 3 is connected in series with a coil of one of the magnets 58 of the driving motor 12, and therefore the effective wattage of the current circulating through the two magnets in series pulsates, thus producing a variation of pulsation in the magnetic flux which is generated in the electromagnet 58 of the driving motor. The pulsation of the current is illustrated in Figure 6. The five positions corresponding to an angular movement of 45° are again marked in the diagram and moreover the theoretical amperage of the current flowing through the coils of magnet 58, as regulated by the poles of the distribution and control device, is indicated at $i$. It is seen that the fluctuations of the current produced directly produce the desired current pulsations in the circuits of the coils of the driving motor.

Figure 7:
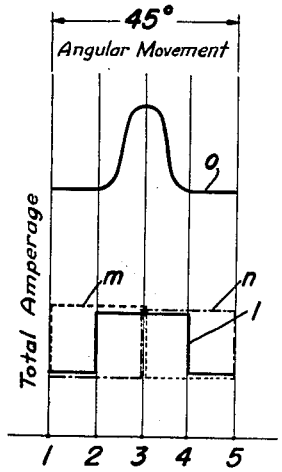
Figure 7 is a graph illustrating the total amperage supplied to the motor during an angular movement of the rotor through 45°.

Figure 7 shows a graph of the total amperage for three coils of the driving motor during an angular movement of 45° performed by the rotor. The current flowing through the three coils during this angular movement are marked by the three lines $l$, $m$, $n$, drawn in full lines, in broken lines, in dots and dashes, respectively, the total amperage, corresponding to the current consumption of the device (with three coils), being indicated by the curve $o$.

The modification shown in Figure 4 relates to a structure in which the production of an arc or spark within the container is not objectionable. In this construction, the rotor 77 of the distribution control device 22 may either be a notched wheel or may consist of a wheel in which the notches 78 have been filled by an insulating material so that a drum results having alternating insulating and conducting sections. The structure is therefore similar to that of a commutator. This commutator cooperates with a number of contact springs 80, each of which controls the energizing circuit 81 of one of the electromagnets 59 of the driving motor 12.

The conducting segments 83 of the rotor 77 are connected electrically with the collector 84 cooperating with a brush 85, which in its turn is connected by a suitable conductor passing from the interior of the sealed container to the outside with a terminal 90 of the network feeding the device. The other terminal 89 on the network is connected with a common conductor 88 with which all the magnets 59 of the driving motor 12 are connected on one side.

It will be clear that the energization of each of the magnets 59 is controlled by the contact of a spring 80 which is associated with is energizing circuit with the conducting segments 83, and therefore each magnet will be alternately energized and deenergized when its brush 80 makes contact with successive insulating and conducting segments. The proper sequence of the energization of the magnets is, in this case, obtained by a proper selection of the angular position of the contact brushes 80 with respect to each other.

In the arrangement shown which is symmetrical, the number of brushes may be reduced as two magnets are always energized symmetrically.

It will thus be seen that the arrangement according to the invention permits to drive a unit housed within the sealed container by means of an electric motor, the rotating member of which is sealed in, which operates under satisfactory conditions at low speed and at higher speeds, and which develops an almost uniform torque during operation and a torque of a predetermined minimum value at the start in whatever position the rotor of the electric motor may happen to be. In the example shown having eight teeth and six electromagnets, the minimum torque developed in every position is sixty-six per cent of the maximum torque which is developed during running, a result which is satisfactory for most purposes and is especially acceptable for the purpose of driving the compressor of a refrigerator.

It will be noted that in this way the difficulties with respect to the starting which are usually experienced in connection with single phase motors are eliminated. It will also be noted that the current drawn during starting does not reach extraordinary high values such as drawn by induction motors during starting. Moreover, no shading coils and similar expedients, greatly increasing the production cost, are necessary for a motor of the type described.

While the efficiency of the magnetic motor is lower than that of induction motors and other single phase motors, this decrease in the deficiency does not play a decisive part with motors of small wattage capable of running at low speed, the latter being a marked advantage for units driving compressors.

The rotor is fully balanced and the motor, therefore, operates without noise and under favorable conditions. Neither the driving motor itself nor the distribution control device is likely to get out of order, as the construction is simple and rugged and as the control is effected merely by the angular position of the magnetic elements which is not subject to any change.

It will be understood that a number of modifications may be introduced with respect to the construction of the unessential parts of the invention and that such modifications do not constitute a departure from the essence of the invention as defined by the subjoined claims.

Having described the invention, what is claimed as new is:

1. A driving system for units rotatable within a closed sealed container, comprising a drive shaft held within said container, an electric driving motor for the same, said electric driving motor including a notched wheel of magnetically permeable material fixedly connected with said drive shaft and rotatable within the container and a number of electromagnetic coils surrounding the notched wheel, said electromagnetic coils being arranged on the outside of the container, a source of alternating current for supplying the electromagnetic coils with energizing current, a second rotor on said drive shaft, electromagnetic coils surrounding the said second rotor on the outside of the container, and means for controlling the energization of the electromagnetic coils of the electric motor, said means including the electromagnetic coils surrounding the second rotor.

2. A driving system for units rotatable within a closed sealed container of non-magnetic material comprising a drive shaft for driving the rotatable units arranged within said sealed container, an electric motor driving said drive shaft, said electric motor including a rotor consisting of a notched wheel of magnetic material fixedly connected with the drive shaft and further including a number of electromagnetic coils surrounding said rotor and said container, annular inserts of magnetically permeable material inserted into the container wall in the annular zone of the container wall surrounding said rotor, and surrounded by the electromagnetic coils, means for supplying said electromagnetic coils with current, control means for controlling the energization of each of the electromagnetic coils, said controlling means including a second series of electromagnetic coils, surrounding the sealed container and a second rotor surrounded by said second series of coils, said rotor being fixedly mounted on the drive shaft and being provided with means for varying the inductance of the electromagnetic coils surrounding said first named rotor.

3. A driving system for units rotatable within a closed sealed container of non-magnetic material comprising a drive shaft for driving the rotatable units arranged within said sealed container, an electric motor driving said drive shaft, said electric motor including a rotor consisting of a notched wheel of magnetic material fixedly connected with the drive shaft and further including a number of electromagnets surrounding said rotor and said container, annular inserts of magnetic material inserted into the container wall in the annular zone of the container wall surrounding said rotor, and surrounded by the electromagnets, means for supplying said electromagnets with current, control means for controlling the energization of each of the electromagnets independently, said means including a further rotor fixed on said drive shaft within the sealed container and electromagnets surrounding the said further rotor, each of said electromagnets surrounding said further rotor controlling the energization of one of the electromagnets of the motor driving the drive shaft.

4. A driving system as claimed in claim 3 wherein the control means for controlling the energization of each of the electromagnets further includes relay means.

5. A driving system for units rotatable within a closed sealed container of non-magnetic material comprising a drive shaft for driving the rotatable unit arranged within said sealed container, an electric motor driving said drive shaft, said electric motor including a rotor consisting of a notched wheel of magnetic material fixedly connected with the drive shaft and further including a number of electromagnets surrounding said rotor and said container, annular inserts of magnetic material inserted into the container wall in the annular zone of the container wall surrounding said rotor, and surrounded by the electromagnets, means for supplying said electromagnets with current, an energizing circuit for each of said electromagnets, a relay means controlling each of said energizing circuits, an energizing circuit for each of said relay means, and means for controlling the energy supply to the energizing circuits of said relay means, said means including a distribution controlling motor structure with a rotor fixed on said drive arranged within said sealed container and further including a number of electromagnets surrounding the rotor of said further electromotor, each electromagnet of said further motor being arranged in the energizing circuit of one of said relay means.

6. An electric motor of the type having a rotor without windings comprising a drive shaft, a rotor consisting of a notched wheel of magnetically permeable material, a system of independently controllable electromagnetic coils surrounding said rotor, energizing circuits for each of said electromagnetic coils, means driven by the drive shaft for controlling the energizing circuits of the electromagnetic coils in succession, said means including a second rotor fixedly connected with the drive shaft, a second system of electromagnetic coils surrounding the said second rotor, each electromagnetic coil of said second system controlling the energization of one of the electromagnetic coils of the first named system of electromagnetic coils.

7. An electric motor of the type having a rotor without windings for driving units contained in a closed and sealed container as claimed in claim 6, wherein each electromagnetic coil of the second system is arranged in series with an electromaget of the first-named system in the energizing circuit of the latter.

8. A driving system for units rotatable within a completely closed and sealed container, comprising a drive shaft held within the container, two rotors of magnetically permeable material both held on and fixed to the said drive shaft within the said sealed container, a series of electromagnetic coils arranged on the outside of the sealed container and surrounding one of the said rotors and forming a stator driving said rotor, further electromagnetic coils surrounding the second rotor on the outside of the container, the said second rotor being provided with means for varying the inductance of the electromagnetic coils surrounding it, said last named electromagnetic coils controlling the energization of the first named electromagnetic coils forming the stator of the first rotor.

LOUIS KRITTER.

References Cited in the file of this patent

UNITED STATES PATENTS

| Number | Name | Date |
| --- | --- | --- |
| 545,591 | Kramer | Sept. 3, 1895 |
| 587,769 | Thoma | Aug. 10, 1897 |
| 592,244 | Fay | Oct. 26, 1897 |
| 1,722,284 | Fisher | July 30, 1929 |
| 2,210,412 | Jones et al. | Aug. 6, 1940 |
| 2,245,577 | Dieckman | June 17, 1941 |
| 2,279,690 | Lindsey | Apr. 14, 1942 |